United States Patent

Kim

Patent Number: 5,335,069
Date of Patent: Aug. 2, 1994

[54] SIGNAL PROCESSING SYSTEM HAVING VERTICAL/HORIZONTAL CONTOUR COMPENSATION AND FREQUENCY BANDWIDTH EXTENSION FUNCTIONS

[75] Inventor: Jung H. Kim, Seoul, Rep. of Korea

[73] Assignee: SamSung Electronics Co., Ltd., Suwon, Rep. of Korea

[21] Appl. No.: 826,781

[22] Filed: Jan. 28, 1992

[30] Foreign Application Priority Data

Feb. 1, 1991 [KR] Rep. of Korea ............... 91-1788

[51] Int. Cl.$^5$ ............................................. H04N 9/68
[52] U.S. Cl. ........................... 348/630; 348/649; 348/712; 348/713; 348/678
[58] Field of Search ............... 358/27, 28, 37, 164, 358/169, 162, 39, 40, 168, 166; H04N 9/68

[56] References Cited

U.S. PATENT DOCUMENTS

| | | | |
|---|---|---|---|
| 3,950,780 | 4/1976 | Freestone | 358/28 |
| 4,030,121 | 6/1977 | Faroudja | 358/166 |
| 4,153,911 | 5/1979 | Isono et al. | 358/28 |
| 4,262,304 | 4/1981 | Faroudja | 358/166 |
| 4,306,247 | 12/1981 | Tomimoto et al. | 358/28 |
| 4,403,253 | 9/1983 | Morris et al. | 358/166 |
| 4,652,938 | 3/1987 | Murakami et al. | 358/310 |
| 4,677,461 | 6/1987 | Mizutani et al. | 358/37 |
| 4,916,538 | 4/1990 | Carver et al. | 358/166 |
| 5,053,865 | 10/1991 | Ubukata | 358/37 |
| 5,083,198 | 1/1992 | Haferl et al. | 358/169 |
| 5,124,787 | 6/1992 | Lee et al. | 358/37 |
| 5,150,214 | 9/1992 | Shin et al. | 358/166 |
| 5,191,421 | 3/1993 | Hwang | 358/168 |

OTHER PUBLICATIONS

Preliminary Data Sheet, MOS Integrated Circuit μPD9381, NEC Electron Device (Dec. 1989).

*Primary Examiner*—Mark R. Powell
*Assistant Examiner*—Jeffrey S. Murrell
*Attorney, Agent, or Firm*—Robert E. Bushnell

[57] ABSTRACT

A signal processing system is disclosed in which the image resolution is improved by extending the horizontal frequency bands of separated luminance and chrominance signals and compensating the contour of an input image signal, the frequency band of the input chrominance signal is extended by the chrominance signal processing part, and by the extension of frequency band, the transition time of the high frequency components of the image signal is reduced for the high frequency image signal processing and reducing the short data processing time.

33 Claims, 6 Drawing Sheets

LUMINANCE CRISPENER (100)

HORIZONTAL CONTOUR COMPENSATOR (200)

GREY CONTROLLER (300)

AUTOMATIC CHROMINANCE GAIN CONTROLLER (500)

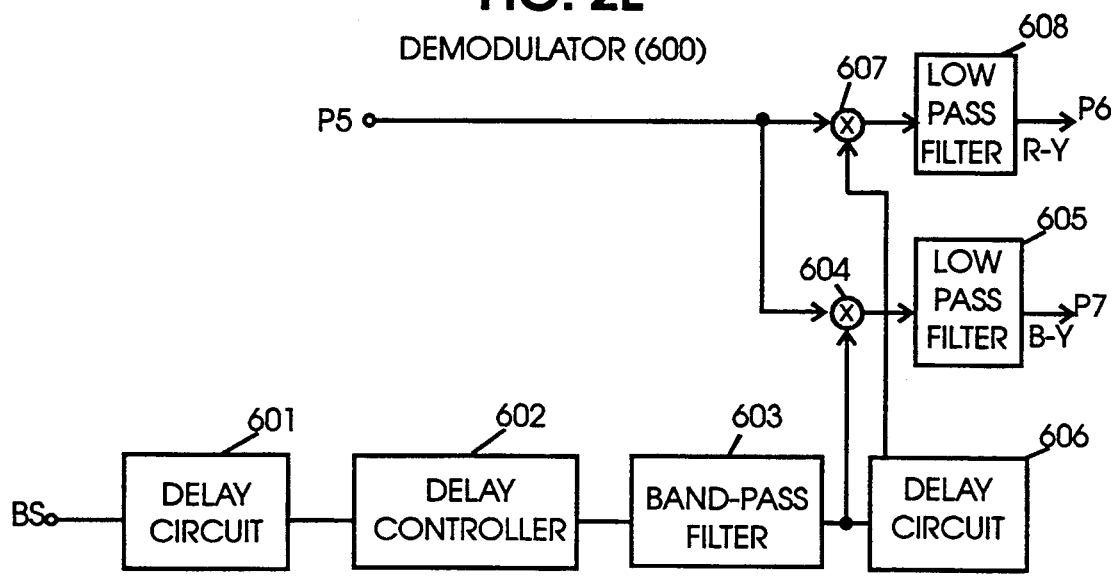
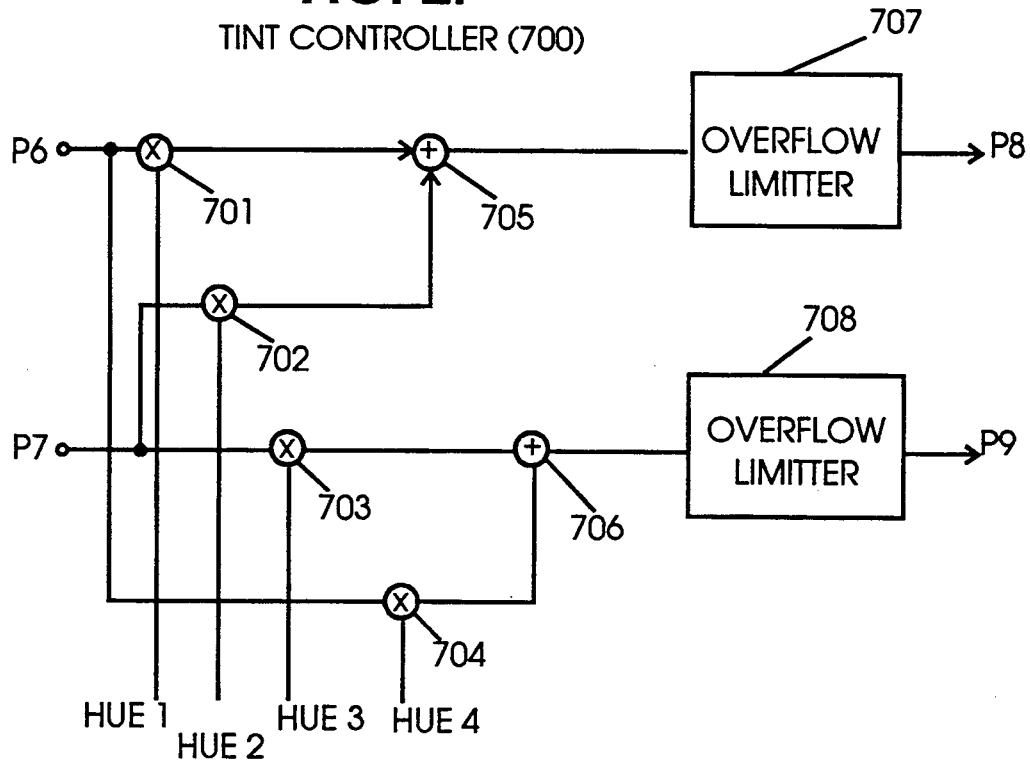

CHROMINANCE CRISPENER (800)

FIG. 2H-a
LUMINANCE SIGNAL MIXER (400)
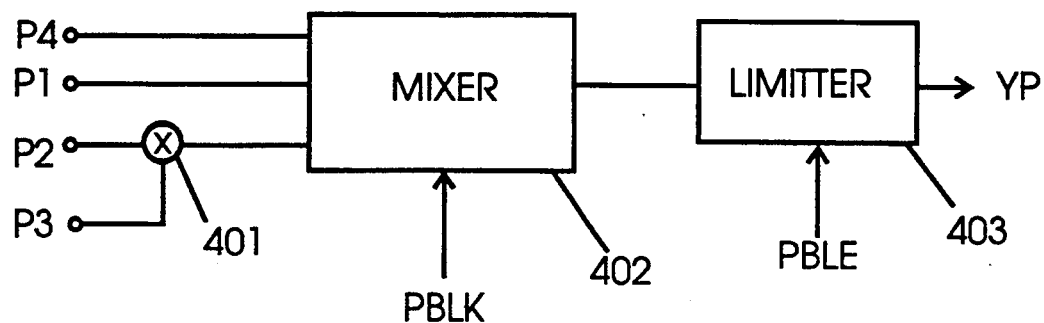
FIG. 2H-b
CHROMINANCE MULTIPLEXER (900)
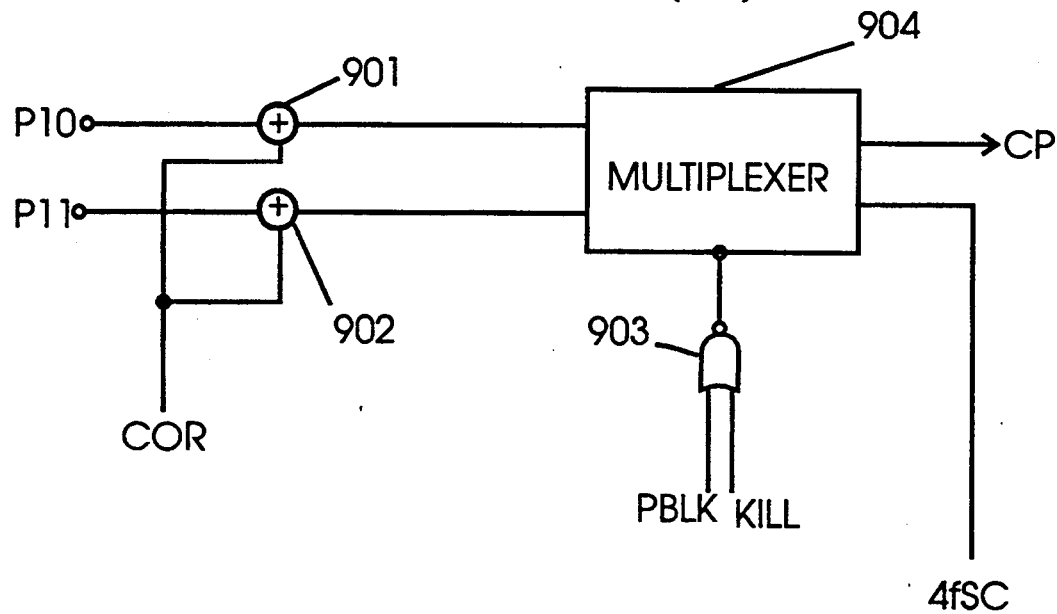

SIGNAL PROCESSING SYSTEM HAVING VERTICAL/HORIZONTAL CONTOUR COMPENSATION AND FREQUENCY BANDWIDTH EXTENSION FUNCTIONS

BACKGROUND OF THE INVENTION

The present invention relates to digital image processing systems and, more particularly, to a signal processing system for improving the resolution by mean of compensating the contour of luminance and chrominance signals and extending their horizontal frequency bandwidth.

In conventional digital image processing systems using a standard signal, the frequency band of a luminance signal is 4.2 MHz, while those of chrominance signals R-Y and B-Y are 1.3 and 0.5 MHz, respectively. The luminance signal is added to an original signal after compensation of its horizontal-contour and the chrominance signals are band-amplified and next demodulated, where band-amplification gain is determined by an automatic chrominance gain controller, depending on the demodulated chrominance signals. The processed luminance and chrominance signals are mixed again at a matrix part and next displayed on a screen.

With low frequency bands of image signals, however, high frequency components are not processed sufficiently due to the difference of transition times resulting from the level difference, thereby degrading the resolution.

SUMMARY OF THE INVENTION

The present invention solves these problems and provides a signal processing system for improving the resolution by extending the horizonal frequency bands of separated luminance and chrominance signals and compensating the contour of an input image signal.

According to the present invention, there is provided a digital image processing system comprising a luminance crispener for reducing a transition time and extending a frequency band of a luminance signal; a horizontal contour compensator for compensating a horizontal contour of an input luminance signal; a gray controller for amplifying a low level component of the input luminance signal; a luminance signal mixing means for mixing and providing output signals with one line after receiving the output signals from the luminance crispener, the horizontal contour compensator and the gray controller; an automatic chrominance gain controller for amplifying and only maintaining the level of the input chrominance signal constant; a demodulator, connected to the output terminal of the automatic chrominance gain controller, for converting the chrominance signal of the constant level to a digital signal and demodulating it by a 1 H (H: one period of horizontal scanning line) delayed burst signal; a tint controller, connected to the output terminal of the demodulator, for controlling the tint of the demodulated chrominance signal; a chrominance crispener, connected to the output terminal of the tint controller, for reducing the transition time and extending the frequency band of the controlled chrominance signal; and a chrominance multiplexer, connected to the output terminal of the chrominance crispener, for multiplexing output signal with one line after receiving the output signals in two lines from the chrominance crispener.

BRIEF DESCRIPTION OF THE DRAWINGS

FIGS. 2A~2H are detailed circuit diagrams of major parts of the signal processing system according to the present invention.

DETAILED DESCRIPTION OF THE PREFERRED EMBODIMENT

Figure 1:
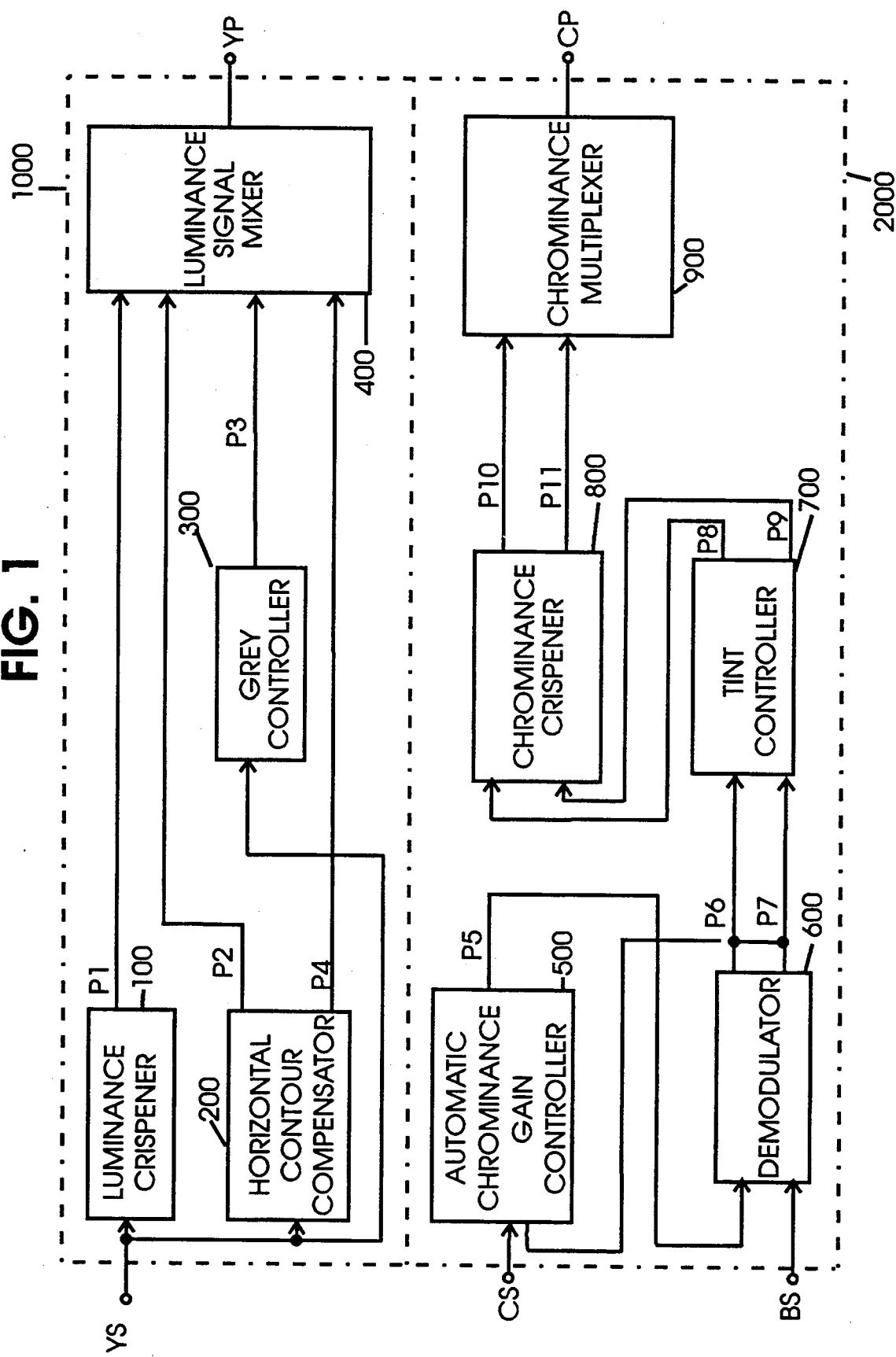
FIG. 1 is the block diagram of a signal processing system according to the present invention.

FIG. 1 shows a signal processing system according to the present invention, which comprises a luminance processing part 1000 for amplifying low level components of an input luminance signal after reducing transition time and compensating horizontal contour, and a chrominance processing part 2000 for extending frequency band of an input chrominance signal.

To describe in more detail, the luminance signal processing part 1000 comprises a luminance crispener 100 for reducing the transition time and extending the frequency band of the luminance signal, a horizontal contour compensator 200 for compensating the horizontal contour of the input luminance signal, a gray controller 300 for amplifying the low level component of the input luminance signal, and a luminance signal mixer 400 for mixing and providing output signals with one line after receiving the output signals from the luminance crispener 100, the horizontal contour compensator 200, and the gray controller 300.

A chrominance signal processing part 2000 comprises an automatic chrominance gain controller 500 for maintaining the level of the input chrominance signal constantly, a demodulator 600 connected to an output terminal of the automatic chrominance gain controller 500, for converting the chrominance signal of the constant level to a digital signal and demodulating it by an 1B (B: one period of horizontal scanning line) delayed burst signal, a tint controller 700 connected to an output terminal of the demodulator 600 for controlling the tint of the demodulated chrominance signal, a chrominance crispener 800 connected to the output terminal of the tint controller 700 for reducing the transition time and extending the frequency band of the controlled chrominance signal, and a chrominance multiplexer 900 connected to an output terminal of the chrominance crispener 800 for multiplexing the output signal from the chrominance crispener 800 from two lines into one line.

Figure 2A:
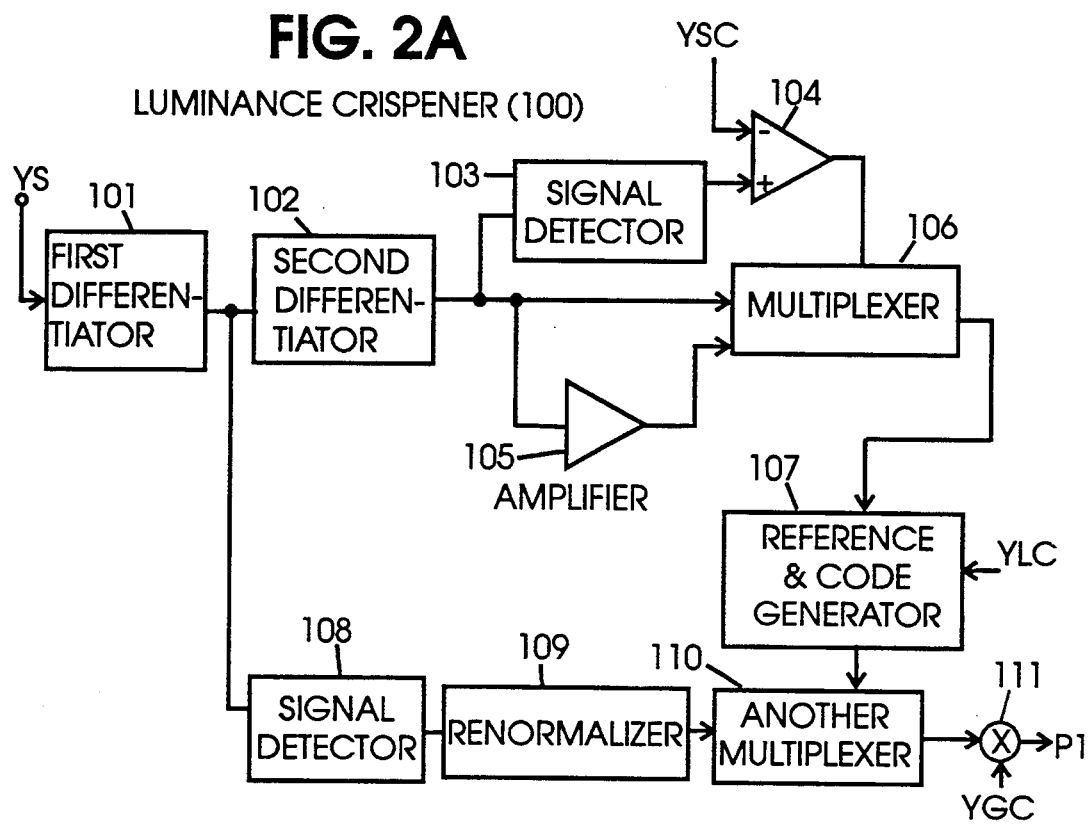
Figure 2B:
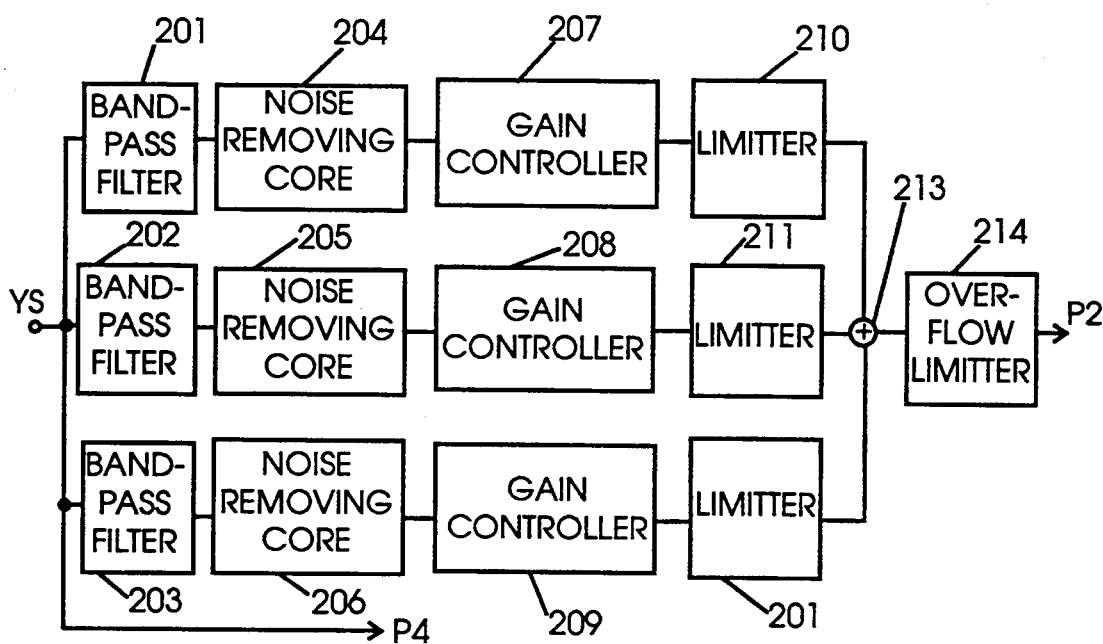
Figure 2C:
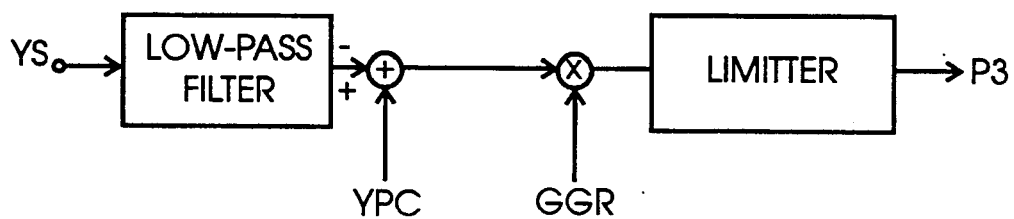
Figure 2D:
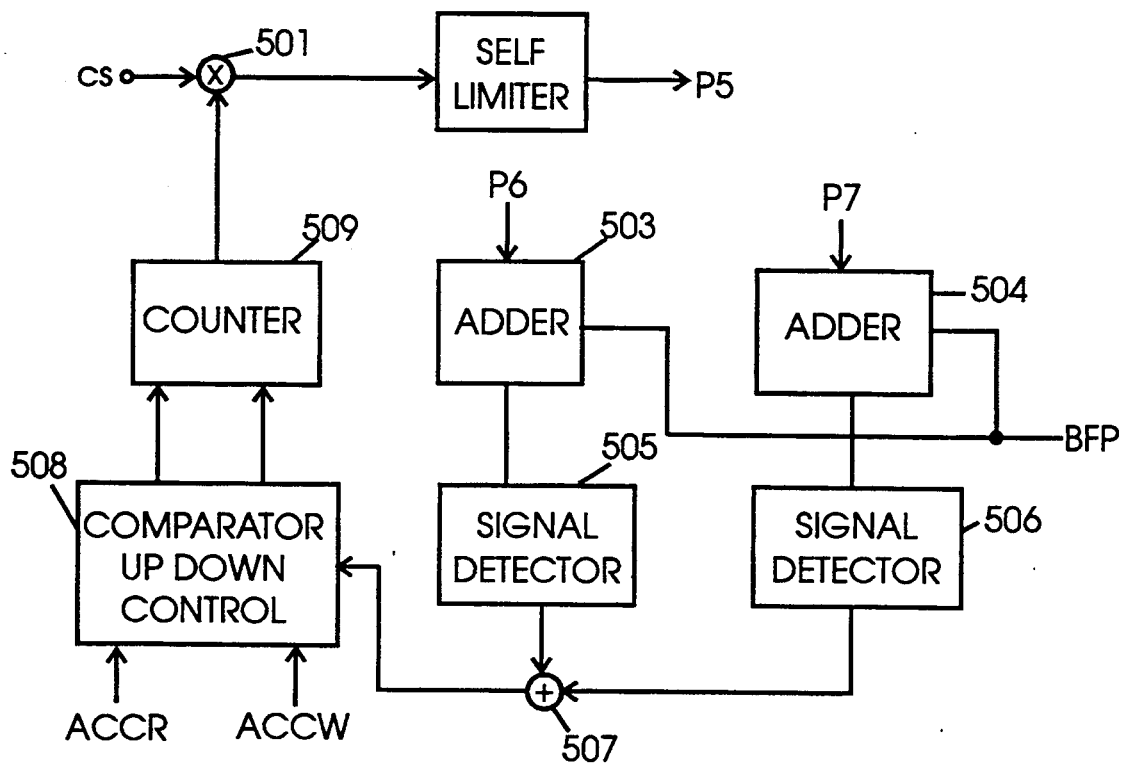
Figure 2G:
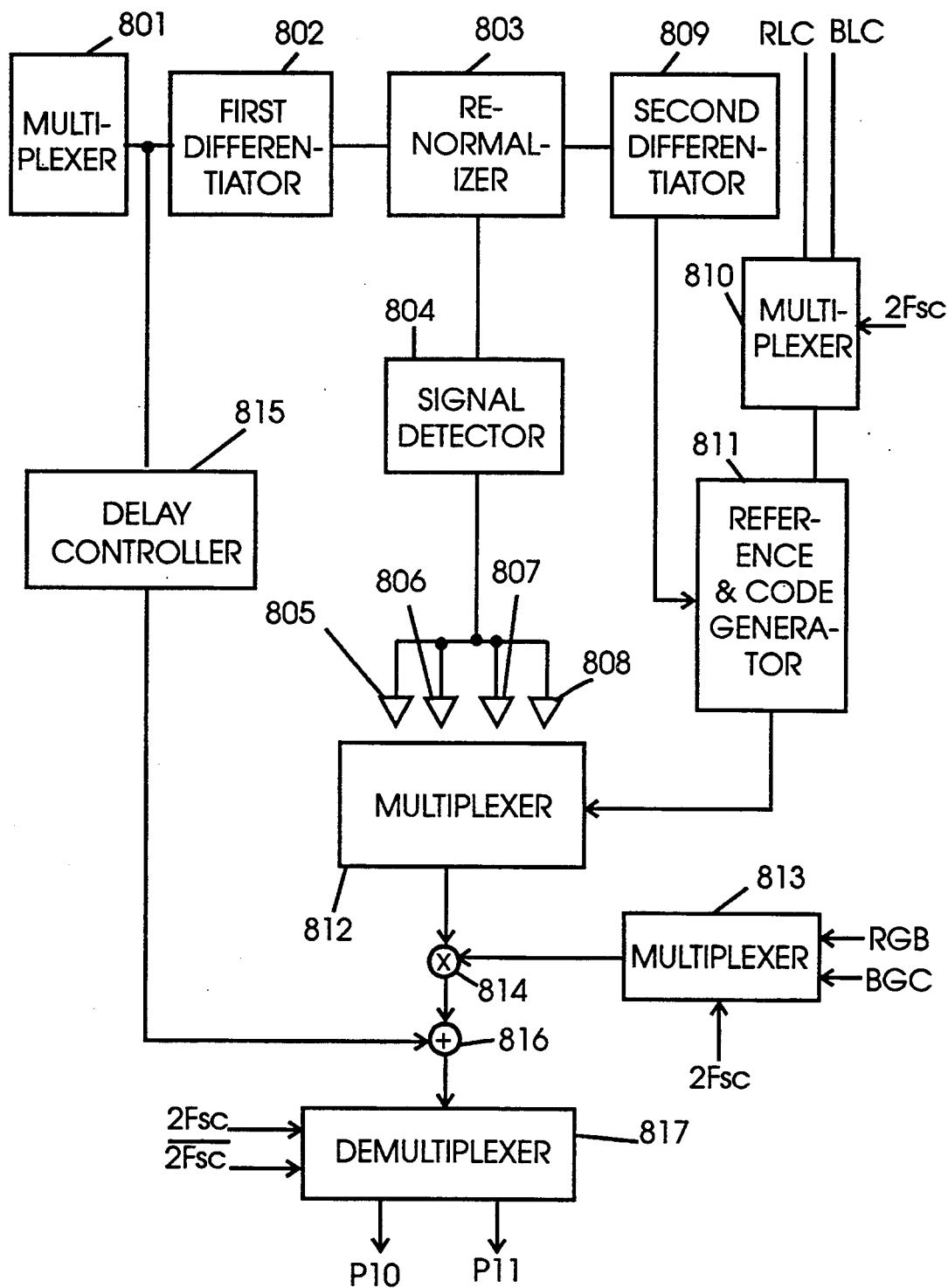

FIG. 2 shows detailed circuit diagrams of each block in the image processing system according to the present invention, wherein FIG. 2A shows the luminance crispener 100 in the luminance signal processing part 1000, FIG. 2B shows the horizontal contour compensator 200 in the luminance signal processing part 1000, FIG. 2C shows the gray controller 300 in the luminance signal processing part 1000, FIG. 2D shows the automatic chrominance gain controller 500 in the chrominance signal processing part 2000, FIG. 2E shows the demodulator 600 in the chrominance signal processing part 2000, FIG. 2F shows is the tint controller 700 in the chrominance signal processor 2000, and FIG. 2G shows the chrominance crispener 800 in the chrominance signal processor. Further, FIGS. 2B-*a* and 2H-*b* are detailed circuit diagrams of the luminance signal mixer 400 in the luminance signal processing part 1000 and the chrominance multiplexer 900 in the chrominance signal processing part 2000.

In the luminance crispener 100 of the luminance signal processing part 1000, a second differentiater 102 for detecting rising and falling edges is connected to a first differentiater 101 for detecting the contour of a separated luminance signal, and a signal detector 103 for detecting an absolute value is connected to an output terminal of the second differentiater 102 as shown in FIG. 2A.

Also, a comparator 104 is connected to the output terminal of the signal detector 103 so as to provide an output signal from the signal detector 103 directly, when the output signal of the signal detector 103 is larger than a luminance control signal YSC. On the other hand, if the level of the output signal from the second differentiater 102 is the level of the output signal from the second differentiater 102 is low, it is applied to an amplifier 105 so that its level is magnified by a factor of 2.

The output signal from the comparator 104 and the output signal of the amplifier 105 are connected to input terminals of a multiplexer 106. Subsequently, a reference and code generator 107 is connected to the multiplexer 106 to generate and digitalize a reference signal according to a luminance limit control signal YLC.

Another signal detector 108 for detecting the absolute value of the detected contour signal is connected to the output terminal of the first differentiater 101. A re-normalizer 109 is also connected to an output terminals of this signal detector 108 for normalizing the detected signal once more. Another multiplexer 110 is connected to both output terminals of the reference and code generator 107 and the re-normalizer 109 for selecting and providing one of them through an output terminal. An amplifier 111 is connected to both output terminals of the multiplexer 110 and the luminance gain control signal YGC.

In the contour compensator 200 of the luminance signal processing part 1000, noise removing cores 204, 205, and 206 are respectively connected to band-pass filters 201, 202, and 203 for filtering the separated luminance signal, as shown in FIG. 2B. Gain controllers 207, 208, and 209 for magnifying gains of emphasized frequency band are connected to the output terminals of the noise removing cores 204, 205, and 206. Limiters 210, 211, and 212 for preventing degradation of a screen due to the over-emphasis are respectively connected to the output terminals of the gain controllers 207, 208, and 209. An adder 213 is connected to the output terminals of this limiters 210, 211, and 212. Further, an overflow limiter 214 for limiting the added signal to 8-bit is connected to an output terminal of the adder 213.

As shown in FIG. 2C, in the gray controller 300 of the luminance signal processing part 1000, an adder 302 is connected to an output terminal of a low-pass filter 301 for detecting the average level of the separated luminance signal to add a maximum luminance level YPC. An amplifier 303 for multiplying a reference gray gain value GGR is connected to the output terminal of the adder 302 and a limiter 304 is connected to an amplifier 303 to prevent over-amplification.

The output signal P1 from the luminance crispener 100 shown in FIG. 2A, the output signal P2 from the horizontal contour compensator 200 shown in FIG. 2B, the output signal P3 from the gray controller 300 shown in FIG. 2C, and the separated luminance signal P4 are all applied to a mixer 400 in the luminance signal processing part 1000.

As shown in FIG. 2B-a, the luminance signal mixer 400 in the luminance signal processing part 1000 includes a multiplier 401 for transmitting two input signals P2, P3, a mixer 402 connected to the output terminals of the amplifier 111 in the luminance crispener 100, the overflow limiter 214 in the horizontal contour compensator 200, the limiter 304 in the gray controller for transmitting the respective output signals P1~P3 and the separated luminance signal P4 commonly in one line, and a black level limiter 403 connected to the output terminal of the mixer 402 for limiting the black level of the input signal according to a black level limit enable signal.

In the automatic chrominance controller 500 as shown in FIG. 2D, a self-limiter 502 is connected to an amplifier 501 to limit over-amplified signals.

The demodulator 600 shown in FIG. 2E is connected to this self-limiter 502.

In this demodulator 600, a delay 601 for delaying the digitalized burst signal by 1H is connected to a delay controller 602 to synchronize the delayed signal with its original signal. A band-pass filter 603 for removing direct current DC component is connected to the output terminal of this delay controller 602. Also, a delay circuit 606 is connected to a band-pass filter 603 to delay an output signal of the band-pass filter 603. An amplifier 607 is connected to the output terminal of this delay circuit 606 for amplifying the output signal P5 from the self-limiter 502 in the automatic chrominance gain controller 500. A low-pass filter 608 for removing the doubled burst signal is connected to an output terminal of a multiplier 607. Here, the output signal P6 from the low-pass filter 608 is a red chrominance signal R-Y and the output signal P7 from the low-pass filters 605 is a blue chrominance signal B-Y.

The output signals P6 and P7 in the demodulator 600 are fed back the automatic chrominance gain controller 500 in FIG. 2D and provided to adders 503 and 504, respectively, to be summed up during the period of a burst flag pulse BFP. Output terminals of the adders 503 and 504 are connected to signal detectors 505 and 506 for calculating and providing the absolute values to an adder 507 for adding the detected absolute values.

A comparator 508 is connected to the output terminal of the adder 507 for comparing automatic chrominance reference signal ACCR, an automatic chrominance holding range signal ACCW and the output signal from the adder 507 to provide counting signals. Subsequently, a counter 509 is connected to the output terminal of the comparator 508 to count the output signals of the comparator 508. Then, the input chrominance signal is multiplied by the output signal of the counter 509, for amplication.

In FIG. 2F, the output signals P6 and P7 of the low-pass filters 608 and 605 are applied to amplifiers 701–704 for amplifying the signals P6 and P7 according to tint control signals Hue1-Hue4 in the tint controller 700. An adder 705 is connected to the output terminals of the amplifiers 701 and 702, and another adder 706 is connected to the output terminals of the adders 703 and 704. Overflow limiters 707 and 708 are respectively connected to the adders 705 and 706, to thereby prevent the overflow of the added signals.

A multiplexer 801 in the chrominance crispener 800 is connected to the output terminals of the overflow limit 707 and 708 in the tint controller 700, as shown in FIG. 2G, so that one of two chrominance signals P8 and P9 is selected corresponding to the doubled burst signal 2Fsc and provided through an output terminal. A first differentiater 802 is connected to the multiplexer 801, thereby normalizing its output signal.

A re-normalizer 803 connected to the first differentiater 802 delays the output signal from the first differentiater 802 by 4 H and compares the delayed signal with the undelayed signal, thereafter providing a minimum value when the compared result is positive and a maximum value when the delayed compared result is negative. An absolute value detector 804 is connected to the re-normalizer 803 and four amplifiers 805~808 are connected to the output terminal of this absolute value detector 804 to get the amplification gains of 1, 0.5, −0.5, −1, respectively.

On the other hand, a first differentiater 809 for second-order is connected to the output terminal of the re-normalizer 803. A reference and code generator 811 is connected to the output terminal of this differentiater 809 for generating codes according to the output signal of a multiplexer 810 which transmits one of two limit reference signals RLC and BLS for the red and blue chrominance signals. The output signals of the amplifiers 805~808 are applied to a multiplexer 812 for selecting one of them according to an output signal from the reference and code generator 811. Also, an amplifier 814 for amplifying the output from a multiplexer 813 is connected to the multiplexer 812 transmit one of gain control signals RGC and BGC for red and blue color-difference signals.

A delay controller 815 is connected to the output terminal of the multiplexer 801 to synchronize the delayed signal with the original signal, i.e., the undelayed signal. Also, an adder 816 is connected to both the amplifier 814 and the delay controller 815 and thereby their output signals are added to each other. The output signal from the adder 816 is applied to a demultiplexer 817 for providing chrominance signals P6 and nP10 to a chrominance multiplexer 900.

As shown in FIG. 2H-$b$, the output terminals of the demultiplexer 817 is respectively connected to adders 901 and 902 where the outputs from the demultiplexer 817 are added to a chrominance offset reference signal COR, and the outputs from these adders 901 and 902 are applied to a multiplexer 904 for selecting and providing one of the outputs from the adders 901 and 902 according to the output signal from a NOR gate 903 or the quadrupled burst signal 4Fcs. Here, the NOR gate 903 provides the combined signal of input control signals PBLK and Kill.

In the present invention as described hereinabove, if the separated luminance signal YS is applied to the input terminal in FIG. 2A, it is normalized by the first differentiater 101 in the luminance crispener 100 and next its rising and falling edges are detected by the second differentiater 102. The absolute value of the output signal from the second differentiater 102 is detected by the signal detector 103 and compared with the luminance control signal YSC at the comparator 104.

According to the compared result, one of the two inputs of the multiplexer 106 is selected and transmitted. In other words, if the absolute value of the output signal from the second differentiater 102 is larger than the YSC signal, the output signal from the second differentiater 102 is directly provided throuth the multiplexer 106. But, if the absolute value of the output from the second differentiater 102 is smaller than the YSC signal, the output from the second differentiater 102 amplified by the amplifier 105 is provided through the multiplexer 106. Then, the output signal from the multiplexer 106 is changed to a certain code according to the luminance limit control signal YLC.

The absolute value of the output signal of the first differentiater 101 is also detected by the signal detector 108 and amplified by the re-normalizer 109, where the gain of the re-normalizer 109 is selected among −A, 0.5A, 0.5A, and A. Either the output signal from the re-normalizer 109 or the output signal from the reference and code generator 107 is selected by the multiplexer 110 and provided to the multiplier 111. Thus, the output signal from the multiplexer 110 is multiplied according to the luminance gain control signal YGC.

The separated luminance signal YS is filtered by the band-pass filters 201~203 in the horizontal contour compensator 200 in FIG. 2B and each filtered signal corresponding to the pass frequencies of the band-pass filters 201~203 is applied to the noise removing cores 204~206. The outputs from the cores 204~206 are amplified by the gain controllers 207~209, respectively. The output signals from the gain controllers 207~209 are limited by the limiters 210~212 to prevent the degradation due to the over-amplification.

The separated luminance signal applied to the horizontal contour compensator 200 passes the band-pass filters 201~203 for detecting and emphasizing the contour signal corresponding to the pass-band of the filters 201~203, thereby preventing the degradation of the image due to the over-emphasis.

The luminance signal YS is also applied to the low-pass filter 301 in the gray controller 300 in FIG. 2C for detecting its average level. The detected average luminance level is added to the maximum luminance level YPC by the adder 302 and amplified according to the gray gain reference signal GGR. The output from the multiplier 303 is limited by the limiter 304 to prevent the degradation due to the over-amplification.

The output signal P1 from the multiplier 111 in the luminance crispener 100 shown in FIG. 2A, the output signal P2 from the limiter 214 in the horizontal contour compensator 200 in FIG. 2B, the output signal P3 from the limiter 304 in the gray controller 300, and the input luminance signal YS is commonly applied to the mixing block 402 in the mixer 400, as shown in FIG. 2H-$b$.

They are mixed with each other according to the blanking signal PBLK. The black level of the mixed signals is limited according to the black level limit enable signal PBLE. The transition time of the luminance signal is reduced by the luminance crispener 100 in FIG. 2A and the horizontal contour is compensated by the horizontal contour compensator 200. If the level of the luminance signal is low, it is amplified by the gray controller 300 in FIG. 2C. Subsequently, the output signals from each part in FIGS. 2A~2C are mixed by the mixer 400 in FIGS. 2H~2I.

The input chrominance signal CS is applied to the amplifier 501 in FIG. 2D to be properly multiplied by one of the demodulated chrominance signal, the automatic color reference signal ACCR, and the automatic chrominance holing range signal ACCW, so that the white noise is minimized. The output signal from the amplifier 501 is limited by the limiter 502 to prevent the degradation due to the over-amplification. Subsequently, the limited output signal is applied to the demodulator 600.

The digitalized burst signal BS applied to the demodulator 600 in FIG. 2E is 1H-delayed by the delay circuit 601 and this delayed signal is synchronized with its original undelayed signal by the delay controller 602. The direct current DC component of the output signal from the delay controller 602 is removed by the band-pass filter 603. This signal with no direct current DC component is multiplied by the signal P5 from the limiter 502 in FIG. 2D by the amplifiers 604 and 607. The output signals from the amplifiers 604 and 607 are filtered by the low-pass filters 605 and 608, respectively, and thereby removing their burst signal components 2Fsc. The output signals P6 and P7 from the low-pass filters 608 and 605 are applied to the adders 503 and 504 where the applied signals P6 and P7 are continuously added during the burst flag pulse period, respectively.

Next, the absolute values of the output signals from the adders 503 and 504 are detected by the signal detectors 505 and 506, respectively. The output signals from the signal detectors 505 and 506 are added to each other by the adder 507. Subsequently, the output signal from the adder 507 is applied to the comparator 508 to be compared with an automatic chrominance reference signal ACCR and an automatic chrominance holding range signal ACCW and then counted up or down by the counter 509. If the output signal from the adder 507 is smaller than both ACCR and ACCW signals, the comparator 508 generates an up-signal, while if it is larger than ACCR and ACCW signal, the comparator 508 generates a down-signal.

In order to prevent the hysteresis, also, the up/down signal is provided only when it is continuously generated during four horizontal scanning lines 4H. The counter 509 counts the output signal from the comparator 508. the output signal from the counter 509 is applied to the amplifier 501 as a chrominance gain signal. As shown in FIG. 2E, the gain of the chrominance signal CS determines the magnitude according to the output signals of the low-pass filters, if the burst of the chrominance signal is constantly maintained and according to the determined gain, the constant chrominance signal is provided from FIG. 2D.

The output signals P6 and P7 provided from the demodulator 600 are also applied to the tint controller 700. In other words, the output signals P6 and P7 of the demodulator 600 are applied to the multiplier 701~704 in FIG. 2F and multiplied by the tint control signals Hue1~Hue4. To explain in more detail, the red chrominance signal P6 is amplified by the tint control signals Hue1 and Hue4, and the blue chrominance signal P7 is also amplified by the tint control signal Hue2 and Hue3.

The red chrominance signal amplified in the multiplier 701 and the blue chrominance signal amplified in the multiplier 702 are added by the adder 705 and the added signal is applied to the limiter 707 to prevent the over-amplification. Also, the blue chrominance signal amplified in multiplier 703 and the red chrominance signal amplified in multiplier 704 are added by the adder 706 and the added signal is applied to the limiter 708 to prevent the over-amplification. Consequently, the tint of the red and blue chrominance signals P6 and P7 is controlled by the tint controller 700.

The chrominance signals P8 and P9 provided from the tint controller 700 in FIG. 2F is applied to the chrominance crispener 800 shown in FIG. 2G. Then, the horizontal contour of the chrominance signals is compensated and the frequency band is extended up to 3.58 MHz. The chrominance signal P8 and P9 are provided from the tint controller 700, and one of them is transmitted by the multiplexer 801 and differentiated by the first differentiater 802. The output signal from the first differentiater 802 is delayed by the re-normalizer 803 and then is compared with the delayed signal by the re-normalizer 803.

If the compared result is positive, the minimum value is selected and if the compared result is negative, the maximum value is selected. Then, the absolute value of the output from the re-normalizer 803 is detected by the signal detector 804 and next amplified by the amplifiers 805~808 with the gain of 1, 0.5, −0.5, and −1.

The output signal from the re-normalizer 803 is differentiated by the second differentiater 809 and next applied to the reference and code generator 811 so as to be changed to the code according to either the red chrominance limit reference signal BLC or the blue chrominance limit reference signal BLC transmitted through the multiplexer 810. One of the output signals of the amplifiers 805~808 is selected by the multiplexer 812 according to the code signal from the reference and code generator 811 and subsequently applied to the multiplier 814, and therefore, it is multiplied by one of the red chrominance gain control signal RGC and the blue chrominance gain control signal BGC selected by the multiplexer 813.

The output signal from the multiplexer 801 is delayed by the delay controller 815 so as to be synchronous with the output signal from the amplifier 814. Next, the delayed signal and the output signal from the multiplier 814 are added with each other by the adder 816 and applied to the demultiplexer 817, thereby providing signals P10 and P11 according to the doubled burst signal 2Fsc.

These signals P10 and P11 provided from the chrominance crispener 800 in FIG. 2G are applied to the chrominance multiplexer 900 in FIG. 2H-b. The signals P10 and P11 added to the chrominance offset reference signal COR by the adders 901 and 902. The output signals from the adders 901 and 902 are applied to the multiplexer 904 that one of them is selected according to the output signal from the NOR gate 903 which combines the blanking signal PBLK with the white and/or black detecting signal KILL and provided as the processed chrominance signal CP.

As described above, the transition time of the luminance signal YS is reduced and the frequency band is extended by the luminance crispener 100. By the horizontal contour compensator 200, the contour signal which is sensed at the boundary region and can bring about the level transition is compensated by being added to the original signal.

Furthermore, the low level component of the luminance signal YS is added to the original signal by the gray controller 300 and next, if its peak value is smaller than the reference signal value, the peak value is amplified. The output signals from the luminance crispener 100, the horizontal contour compensator 200 and the gray controller 300 and the input luminance signal YS are mixed with each other by the mixer 400 and provided as a processed luminance signal.

The input chrominance signal CS is constantly maintained by the amplifier 501 of which the amplification gain is determined by the red and blue chrominance signals P6 and P7 separated by the demodulator 600. The constantly maintained chrominance signal is again applied to the demodulator 600 and separated to the red and blue chrominance signals P6 and P7 i.e. R-Y and B-Y.

The tint of the separated signals P6 and P7 is controlled by the tint controller 700 and the controlled tint is applied to the chrominance crispener 800. Thus, the frequency bands of the chrominance signals are extended. The frequency-extended signals P10 and P11 are applied to the chrominance multiplexer 900 and provided through one terminal as the processed chrominance signal CP.

As described hereinabove, the horizontal contour of the input luminance signal is compensated and the frequency band is extended by the luminance signal processing means. Also, the frequency band of the input chrominance signal is extended by the chrominance signal processing means. By the extension of frequency band, the transition time of the high frequency components of the image signal is reduced and also the resolution is improved. Thus, the signal processing system according to the present invention is suitable for the high frequency image signal processing and has the short data processing time.

What is claimed is:

1. A image processing system, comprising:
   luminance crispener means for reducing transition time and extending a frequency bandwidth of an input luminance signal;
   horizontal contour compensator means for compensating horizontal contours of said input luminance signal;
   gray controller means for amplifying a low level component of said input luminance signal;
   luminance signal mixer means for mixing the output signals from said luminance crispener means, said horizontal contour compensator means and said gray controller means to provide a processed luminance signal;
   automatic chrominance gain controller means for amplifying and maintaining an input chrominance signal at a constant level;
   demodulator means connected to an output terminal of said automatic chrominance gain controller means, for demodulating the chrominance signal at said constant level with a burst signal to provide a demodulated chrominance signal;
   tint controller means coupled to an output terminal of said demodulator means, for providing a controlled chrominance signal by controlling tint components of the demodulated chrominance signal;
   chrominance crispener means connected to an output terminal of said tint controller means, for reducing transition time and extending a frequency bandwidth of the controlled chrominance signal to provide a crispened chrominance signal; and
   chrominance multiplexer means connected to an output terminal of said chrominance crispener means, for multiplexing the crispened chrominance signal to provide a processed chrominance signal.

2. The image processing system as claimed in claim 1, wherein said luminance crispener means comprises:
   first differentiator means coupled to receive said input luminance signal, for detecting contours of said input luminance signal to provide a first intermediate signal;
   second differentiator means for detecting a number of rising and falling edges of said first intermediate signal to provide a second intermediate signal;
   first detector means for detecting an absolute value of said second intermediate signal; comparator means for comparing the absolute value of said second intermediate signal to a first control signal to enable transmission of said second intermediate signal when the absolute value of said second intermediate signal is higher than said first control signal;
   first amplifier means for amplifying said second intermediate signal if the absolute value of said second intermediate is lower than said first control signal to provide an amplified intermediate signal;
   first multiplexer means for multiplexing said amplified intermediate signal and said second intermediate signal transmitted from said comparator means to provide a first multiplexed signal;
   code generator means for encoding said first multiplexer signal in accordance with a second control signal to provide a coded signal;
   second detector means for detecting an absolute value of said first intermediate signal;
   renormalizer means coupled to said second detector means, for normalizing said first intermediate signal to provide a normalized signal;
   second multiplexer means for multiplexing said coded signal and said normalized signal to provide a second multiplexed signal; and
   second amplifier means for amplifying said second multiplexed signal in accordance with a third control signal to provide a luminance crispened signal.

3. The image processing system as claimed in claim 2, wherein said horizontal contour compensator means comprises:
   plural filter means arranged in parallel, for band-pass filtering said input luminance signal to provide a plurality of filtered signals;
   plural noise remover means for removing noise interference from said plurality of filtered signals to provide a plurality of noise removed signals;
   plural gain controller means for controlling gain emphasis of said plurality of noise removed signals to provide a plurality of gain controlled signals;
   plural limiter means for limiting said gain emphasis of said plurality of gain controlled signals to provide a plurality of gain limited signals;
   adder means for adding said plurality of gain limited signals to provide an added signal; and
   overflow limiter means for limiting said added signal to provide a horizontal contour compensated signal.

4. The image processing system as claimed in claim 3, wherein said gray controller means comprises:
   filter means for low-pass filtering said input luminance signal to provide a filtered signal;
   adder means for adding said filtered signal with a maximum level signal to provide an added signal;
   multiplier means for multiplying said added signal with a reference gray value to provide a multiplied signal; and
   limiter means for limiting said multiplied signal at a first selected black level to generate a gray controlled signal.

5. The image processing system as claimed in claim 4, wherein said luminance signal mixer means comprises:
   multiplier means for multiplying said horizontal contour compensated signal with said gray controlled signal to provide a multiplied signal;
   mixer means for mixing said multiplied signal, said input luminance signal and said luminance crispened signal in accordance with a blanking signal to provide a mixed signal; and
   limiter means for limiting said mixed signal at a second selected black level in accordance with a black level signal to provide said processed luminance signal.

6. The image processing system as claimed in claim 1, wherein said automatic chrominance gain controller means comprises:

first and second adder means for adding first and second demodulated signal during a burst period to provide first and second added signals;

first and second detectors for detecting an absolute value of said first and second added signals to provide first and second detected signals;

third adder means for adding said first and second detected signals to provide a third added signal;

comparator means for comparing said third added signal with a reference signal and a range signal to generate either one of an up-signal and a down-signal during a predetermined number of horizontal scanning lines for preventing hysteresis;

counter means for counting either one of said up-signal and said down-signal to provide a chrominance gain signal;

multiplier means for multiplying said input chrominance signal with said chrominance gain signal to provide a first intermediate signal; and limiter means for limiting said first intermediate signal at a selected gain level to provide a chrominance gain controlled signal.

7. The image processing system as claimed in claim 6, wherein said demodulator means comprises:

first delay means for delaying a burst signal by one horizontal scanning line to provide a first delayed signal;

delay controller means for synchronizing said first delayed signal with said burst signal to generate a delay controlled signal;

first filter means for removing a direct current component of said delay controlled signal to provide a filtered signal;

second delay means for delaying said filtered signal to provide a second delayed signal;

first multiplier means for multiplying said filtered signal with said chrominance gain controlled signal to provide a first multiplied signal;

second multiplier means for multiplying said second delayed signal with said chrominance gain controlled signal to provide a second multiplied signal; and second filter means for filtering said first and second multiplied signals to provide said first and second demodulated signals respectively representative of red-chrominance and blue-chrominance signals.

8. The image processing system as claimed in claim 7, wherein said tint controller means comprises:

means for multiplying said first and second demodulated signals respectively representative of said red-chrominance and blue-chrominance signals with a plurality of tint control signals, and for adding the multiplied demodulated signals respectively to provide first and second color added signals; and first and second limiter means for limiting said first and second color added signals at selected levels to provide first and second tint controlled signals.

9. The image processing system as claimed in claim 8, wherein said chrominance crispener means comprises:

first multiplexer means for multiplexing said first and second tint controlled signals in accordance with a double burst signal to provide a first multiplexed signal;

first differentiator means for normalizing said first multiplexed signal to provide a first differentiated signal;

renormalizer means for delaying said first differentiated signal by four horizontal scanning lines, and for obtaining a comparison by comparing the delayed differentiated signal with said first differentiated signal to provide a normalized signal representative of either one of a maximum value and a minimum value of said first differentiated signal in dependence upon the comparison;

second differentiator means for differentiating said normalized signal to provide a second differentiated signal;

second multiplexer means for selecting one of a red reference signal and a blue reference signal in accordance with said double burst signal to provide a selected reference signal;

code generator means for encoding said second differentiated signal in accordance with said selected reference signal to provide a coded signal;

signal detector means for detecting an absolute value of said normalized signal to provide a detected signal;

plural amplifier means for amplifying said detected signal with a plurality of gain values to provide a plurality of gain detected signals;

third multiplexer means for selecting one of said plurality of gain detected signals in accordance with said coded signal to provide a selected gain detected signal;

fourth multiplexer means for selecting one of a red gain signal and a blue gain signal in accordance with said double burst signal to provide a selected gain signal;

multiplier means for multiplying said selected gain detected signal with said selected gain signal to provide a multiplied signal;

delay controller means for delaying said first multiplexed signal to achieve synchronization with said multiplied signal to provide a delayed signal;

adder means for adding said delayed signal and said multiplied signal to provide an added signal; and demultiplexer means for demultiplexing said added signal in accordance with said double burst signal to provide first and second chrominance crispened signals.

10. The image processing system as claimed in claim 9, wherein said chrominance multiplexer means comprises:

adder means for adding said first and second chrominance crispened signals with a chrominance offset signal to provide first and second intermediate signals;

gate means for logically combining a blanking signal and a kill signal to provide a selected signal; and multiplexer means for selecting one of said first and second intermediate signals in accordance with said selected signal and a quadrupled burst signal to provide said processed chrominance signal.

11. A high frequency image signal processing system, comprising:

means for receiving a luminance signal and a chrominance signal;

luminance processor means for reducing a transition time of frequency components of said luminance signal and extending a frequency bandwidth of said luminance signal, for compensating horizontal contours of said luminance signal, and for controlling gray levels of said luminance signal by amplifying low level components of said luminance signal, to thereby produce a processed luminance signal; and chrominance processor means for gain controlling and demodulating said chrominance signal to produce demodulated chrominance signals, and for controlling tint components of said demodulated chrominance signals, reducing transition time of frequency components of said demodulated chrominance signals and extending a frequency bandwidth of said demodulated chrominance signals, to thereby produce a processed chrominance signal.

12. The high frequency image signal processing signal as claimed in claim 11, wherein said luminance processor comprises:

luminance crispener means coupled to receive said luminance signal, for reducing said transition time of the frequency components of said luminance signal to provide a luminance crispened signal;

horizontal contour compensator means coupled to receive said luminance signal, for compensating horizontal contours of said luminance signal to provide a horizontal compensated signal;

gray controller means coupled to receive said luminance signal, for controlling gain of gray levels of said luminance signal to provide a gray controlled signal; and mixer means for mixing said luminance crispened signal, said horizontal compensated signal, said gray controlled signal and said luminance signal to provide said processed luminance signal.

13. The high frequency image signal processing system as claimed in claim 12, wherein said luminance crispener means comprises:

first differentiator means coupled to receive said luminance signal, for detecting contours of said luminance signal to provide a first intermediate signal;

second differentiator means for detecting a number of rising and falling edges of said first intermediate signal to provide a second intermediate signal;

first detector means for detecting an absolute value of said second intermediate signal;

comparator means for comparing the absolute value of said second intermediate signal to a first control signal to enable transmission of said second intermediate signal when the absolute value of said second intermediate signal is higher than said first control signal;

first amplifier means for amplifying said second intermediate signal if the absolute value of said second intermediate signal is lower than said first control signal to provide an amplified intermediate signal;

first multiplexer means for multiplexing between said amplified intermediate signal and said second intermediate signal transmitted from said comparator means to provide a first multiplexed signal;

code generator means for encoding said multiplexer signal in accordance with a second control signal to provide a coded signal;

second detector means for detecting an absolute value of said first intermediate signal;

renormalizer means coupled to said second detector means for normalizing said first intermediate signal to provide a normalized signal;

second multiplexer means for multiplexing either one of said coded signal and said normalized signal to provide a second multiplexed signal; and second amplifier means for amplifying said second multiplexed signal in accordance with a third control signal to provide said luminance crispened signal.

14. The image processing system as claimed in claim 13 wherein said horizontal contour compensator means comprises:

plural filter means arranged in parallel for band-pass filtering said luminance signal to provide a plurality of filtered signals;

plural noise remover means for removing noise interference from said plurality of filtered signals to provide a plurality of noise removed signals;

plural gain controller means for controlling gain emphasis of said plurality of noise removed signals to provide a plurality of gain controlled signals;

plural limiter means for limiting said gain emphasis of said plurality of gain controlled signals to provide a plurality of gain limited signals;

adder means for adding said plurality of gain limited signals to provide an added signal; and overflow limiter means for limiting said added signal to provide said horizontal compensated signal.

15. The image processing system as claimed in claim 14, wherein said gray controller means comprises:

filter means for low-pass filtering said luminance signal to provide a filtered signal;

adder means for adding said filtered signal with a maximum level signal to provide an added signal;

multiplier means for multiplying said added signal with a reference gray value to provide a multiplied signal; and limiter means for limiting said multiplied signal at a first selected black level to generate said gray controlled signal.

16. The image processing system as claimed in claim 15 wherein said mixer means comprises:

multiplier means for multiplying said horizontal compensated signal with said gray controlled signal to provide a multiplied signal;

mixer means for mixing said multiplied signal, said luminance signal and said luminance crispened signal in accordance with a blanking signal to provide a mixed signal; and limiter means for limiting said mixed signal at a second selected black level in accordance with a black level signal to provide said processed luminance signal.

17. The high frequency image signal processing system as claimed in claim 11, wherein said chrominance processor comprises:

automatic chrominance gain controller means coupled to receive said chrominance signal, for amplifying and maintaining said chrominance signal at a constant gain level in dependence upon said demodulated chrominance signals to provide a chrominance gain controlled signal;

demodulator means coupled to receive said chrominance signal and a burst signal for demodulating said chrominance signal in accordance with said burst signal to provide said demodulated chrominance signals respectively representative of a red-chrominance signal and a blue-chrominance signal;

tint controller means for varying phases of said demodulated chrominance signals to determine correct coloring of said demodulated chrominance signal for providing first and second tint controlled signals;

chrominance crispener means for reducing said transition time of the frequency components of said first and second tint controlled signals to provide first and second chrominance crispened signals; and chrominance multiplexer means for multiplexing said first and second chrominance crispened signals to provide said processed chrominance signal.

18. The image processing system as claimed in claim 17, wherein said automatic chrominance gain controller means comprises:

first and second adder means for adding said demodulated chrominance signals respectively representative of said red-chrominance signal and said blue-chrominance signal during a burst period to provide first and second added signals;

first and second signal detectors for detecting an absolute value of each of said first and second added signals to provide first and second detected signals;

third adder means for adding said first and second detected signals to provide a third added signal;

comparator means for comparing said third added signal with reference signals to generate one of an up-signal and a down-signal during a predetermined number of horizontal scanning lines for preventing hysteresis;

counter means for counting one of said up-signal and said down-signal to provide a chrominance gain signal;

multiplier means for multiplying said input chrominance signal with said chrominance gain signal to provide a first intermediate signal; and limiter means for limiting said first intermediate signal at a selected gain to provide said chrominance gain controlled signal.

19. The image processing system as claimed in claim 18, wherein said demodulator means comprises:

first delay means for delaying said burst signal by one horizontal scanning line to provide a first delayed signal;

delay controller means for synchronizing said first delayed signal with burst signal to generate a delay controlled signal;

first filter means for removing a direct current component of said delay controlled signal to provide a filtered signal;

second delay means for delaying said filtered signal to provide a second delayed signal;

first multiplier means for multiplying said filtered signal with said chrominance gain controlled signal to provide a first multiplied signal;

second multiplier means for multiplying said second delayed signal with said chrominance gain controlled signal to provide a second multiplied signal; and second filter means for filtering said first and second multiplied signals to provide said said demodulated chrominance signals respectively representative of said red-chrominance and blue-chrominance signals.

20. The image processing system as claimed in claim 19, wherein said tint controller means comprises: p1 means for multiplying said demodulated chrominance signals representative of said red-chrominance and blue-chrominance signals with a plurality of tint control signals, and for adding the multiplied demodulated signals respectively to provide first and second color added signals; and first and second limiter means for limiting said first and second color added signals at selected levels to provide said first and second tint controlled signals.

21. The image processing system as claimed in claim 20, wherein said chrominance crispener means comprises:

first multiplexer means for multiplexing said first and second tint controlled signals in accordance with a double burst signal to provide a first multiplexed signal;

first differentiator means for normalizing said first multiplexed signal to provide a first differentiated signal;

renormalizer means for obtaining a delayed differentiated signal by delaying said first differentiated signal by four horizontal scanning lines, and for making a comparison between the delayed differentiated signal with said first differentiated signal to provide a normalized signal representative of either one of a maximum value and a minimum value of said first differentiated signal in dependence upon said comparison;

second differentiator means for differentiating said normalized signal to provide a second differentiated signal;

second multiplexer means for selecting one of a red reference signal and a blue reference signal in accordance with said double burst signal to provide a selected reference signal;

code generator means for codifying said second differentiated signal in accordance with said selected reference signal to provide a coded signal;

signal detector means for detecting an absolute value of said normalized signal to provide a detected signal;

plural amplifier means for amplifying said detected signal with a plurality of gain values to provide a plurality of gain detected signals;

third multiplexer means for selecting one of said plurality of gain detected signals in accordance with said coded signal to provide a selected gain detected signal; p1 fourth multiplexer means for selecting one of a red gain signal and a blue gain signal in accordance with said double burst signal to provide a selected gain signal;

multiplier means for multiplying said selected gain detected signal with said selected gain signal to provide a multiplied signal;

delay controller means for delaying said first multiplexed signal to achieve synchronization with said multiplied signal to provide a delayed signal;

adder means for adding said delayed signal and said multiplied signal to provide an added signal; and demultiplexer means for demultiplexing said added signal in accordance with said double burst signal to provide said first and second chrominance crispened signals.

22. The image processing system as claimed in claim 21, said chrominance multiplexer means comprises:

adder means for adding said first and second chrominance crispened signals with a chrominance offset signal to provide first and second intermediate signals;

gate means for logically combining a blanking signal and a kill signal to provide a selected signal; and multiplexer means for selecting one of said first and second intermediate signals in accordance with said selected signal and a quadrupled burst signal to provide said processed chrominance signal.

23. A method for processing image signal, comprising the steps of:

receiving a luminance signal and a chrominance signal; reducing transition time of high frequency components of said luminance signal and extending a frequency bandwidth of said luminance signal to provide a luminance crispened signal;

compensating horizontal contours of said luminance signal to provide a horizontal compensated signal;

controlling gray gain values of said luminance signal to provide a gray controlled signal;

mixing said luminance crispened signal, said horizontal compensated signal, said gray controlled signal and said luminance signal to provide a processed luminance signal;

gain controlling and demodulating said chrominance signal to provide demodulated chrominance signals respectively representative of a red-chrominance signal and a blue-chrominance signal;

varying phases of said demodulated chrominance signals to determine correct coloring of said demodulated chrominance signal for providing first and second tint controlled signals;

reducing transition time of high frequency components of said first and second tint controlled signals and extending a frequency bandwidth of said first and second tint controlled signals to provide first and second chrominance crispened signals; and multiplexing said first and second chrominance crispened signals to provide a processed chrominance signal.

24. A method for processing image signal, comprising the steps of:

receiving video signals comprising luminance and chrominance components; reducing transition time of the luminance components of said video signals to produce luminance crispened signals;

compensating horizontal contours of the luminance components of said video signals to provide contour-compensated luminance component signals;

controlling gain of gray levels of the luminance components of said video signals to provide gray-controlled luminance component video signals;

controlling magnitudes of the chrominance components of said video signals and demodulating the chrominance components of said video signals to provide demodulated chrominance signals;

controlling tint components of said demodulated chrominance signals to produce tint-controlled chrominance components signals;

reducing transition time of the tint-controlled chrominance components signals to produce chrominance crispened signals;

generating processed luminance signals in dependence upon said luminance crispened signals, said contour-compensated luminance component signals, said gray-controlled luminance component signals and said luminance signals; and generating processed chrominance signals in dependence upon said chrominance crispened signals.

25. A signal processing system, comprising:

means for receiving video signals representative of luminance and chrominance signals;

luminance processor means for processing said luminance signals by reducing transition time of frequency components of said luminance signals, compensating horizontal contours of said luminance signals and controlling gray levels of said luminance signals to produce processed luminance signals; and chrominance processor means for processing said chrominance signals to produce processed chrominance signals, said chrominance processor means comprising:

first means for controlling magnitudes and demodulating said chrominance signals to produce demodulated chrominance signals; and second means for controlling tint components of said demodulated chrominance signals, and for reducing transition time of said demodulated chrominance signals, thereby enabling production of said processed chrominance signals.

26. The signal processing system as claimed in claim 25, wherein said luminance processor means comprises:

luminance crispener means for reducing said transition time of said luminance signals to produce luminance crispened signals;

contour compensator means for compensating horizontal contours of said luminance signals to produce contour compensated signals;

gray controller means for controlling gray levels of said luminance signals to produce gray controlled signals; and mixer means for producing said processed luminance signals by mixing said luminance crispened signals, said contour compensated signals, said gray controlled signals and said luminance signals.

27. The signal processing system as claimed in claim 26, wherein said luminance crispener means comprises:

first differentiator means for detecting contours of said luminance signals to produce first intermediate signals;

second differentiator means for detecting a number of rising and falling edges of said first intermediate signals to produce second intermediate signals;

first detector means for detecting an absolute value of said second intermediate signals;

comparator means for comparing the absolute value of said second intermediate signals to a first control signal to enable transmission of said second intermediate signals when the absolute value of said second intermediate signals is higher than said first control signal;

first amplifier means for amplifying said second intermediate signals if the absolute value of said second intermediate signals is lower than said first control signal to produce amplified intermediate signals;

first multiplexer means for multiplexing between said amplified intermediate signals and said second intermediate signals to produce first multiplexed signals;

generator means for encoding said multiplexer signal in accordance with a second control signal to provide coded signals;

second detector means for detecting an absolute value of said first intermediate signals;

renormalizer means for normalizing said first intermediate signals to produce normalized signals;

second multiplexer means for multiplexing between said coded signals and said normalized signals to produce second multiplexed signals; and second amplifier means for amplifying said second multiplexed signals in accordance with a third control signal to produce said luminance crispened signals.

28. The signal processing system as claimed in claim 26, wherein said contour compensator means comprises:
plural filter means arranged in parallel, for band-pass filtering and removing noise of said luminance signals to produce a plurality of filtered signals;
plural gain controller means for controlling gain emphasis of said plurality of filtered signals to produce a plurality of gain controlled signals;
plural limiter means for limiting said gain emphasis of said plurality of gain controlled signals to produce a plurality of gain limited signals;
adder means for adding said plurality of gain limited signals to produce added signals; and
overflow limiter means for limiting said added signals to produce said contour compensated signals.

29. The signal processing system as claimed in claim 25, wherein said first means of said chrominance processor means comprises:
first delay means for delaying burst signals by one horizontal scanning line to produce first delayed signals;
delay controller means for synchronizing said first delayed signals with said burst signals to generate delay controlled signals;
first filter means for band-passing filtering said delay controlled signal to produce filtered signals;
second delay means for delaying said filtered signals to produce second delayed signals;
first multiplier means for multiplying said filtered signals with said chrominance signals having said magnitudes controlled to produce first multiplied signals;
second multiplier means for multiplying said second delayed signals with said chrominance signals having said magnitudes controlled to produce second multiplied signals;
second filter means for filtering said first and second multiplied signals to produce demodulated chrominance signals respectively representative of color-difference signals;
first adder means for adding said demodulated chrominance signals during a burst period to provide first and second added signals;
signal detectors for detecting absolute values of said first and second added signals to provide first and second detected signals;
second adder means for adding said first and second detected signals to provide third added signals;
comparator means for comparing said third added signals with reference signals to generate one of up-signals and down-signals during a predetermined number of horizontal scanning lines for preventing hysteresis;
counter means for counting one of said up-signals and said down-signals to produce chrominance gain signals;
third multiplier means for multiplying said chrominance signals with said chrominance gain signals to produce third multiplied signals; and
limiter means for limiting said third multiplied signals at a selected level to produce said chrominance signals having said magnitudes controlled.

30. The signal processing system as claimed in claim 25, wherein said second means of said chrominance processor means comprises:
means for multiplying said demodulated chrominance signals with a plurality of tint control signals and adding the multiplied demodulated chrominance signals to produce first and second color added signals;
limiter means for limiting said first and second color added signals at selected levels to produce first and second tint controlled signals;
first multiplexer means for multiplexing said first and second tint controlled signals in accordance with double burst signals to produce first multiplexed signals;
first differentiator means for normalizing said first multiplexed signals to produce a first differentiated signals;
means for obtaining delayed differentiated signals by delaying said first differentiated signals by four horizontal scanning lines, and making a comparison of said delayed differentiated signals with said first differentiated signals to produce normalized signals in dependence upon said comparison;
second differentiator means for differentiating said normalized signals to produce second differentiated signals;
means for generating selected reference and gains signals by selecting one of a red reference signal and a blue reference signal in accordance with said double burst signals;
code generator means for generating coded signals by encoding said second differentiated signals in accordance with said selected reference signals;
signal detector means for detecting an absolute value of said normalized signals to produce detected signals;
plural amplifier means for amplifying said detected signals with a plurality of gain values to produce a plurality of gain detected signals;
means for multiplying selected ones of said plurality of gain detected signals with said selected gain signals to produce multiplied signals;
delay controller means for delaying said first multiplexed signals to achieve synchronization with said multiplied signals to produce delayed signals;
first adder means for adding said delayed signals and said multiplied signals to produce added signals;
demultiplexer means for demultiplexing said added signals in accordance with said double burst signals to provide said first and second chrominance crispened signals;
second adder means for adding said first and second chrominance crispened signals with chrominance offset signals to provide first and second intermediate signals; and
multiplexer means for selecting one of said first and second intermediate signals in accordance with control signals to produce said processed chrominance signals.

31. A method for processing high frequency image signals, comprising the steps of:
receiving luminance and chrominance signals;
generating processed luminance signals by reducing transition time of frequency components of said luminance signals, compensating horizontal contours of said luminance signals, and controlling gray levels of said luminance signal; and generating processed chrominance signals by gain controlling and demodulating said chrominance signals to provide demodulated chrominance signals, and by controlling tint components and reducing transition time of frequency components of the demodulated chrominance signals.

32. The method for processing high frequency image signals as claimed in claim 31, wherein said processed luminance signals generating step comprises:

reducing said transition time of the frequency components of said luminance signal to provide luminance crispened signals;

compensating horizontal contours of said luminance signals to provide horizontal compensated signals;

controlling gains of gray levels of said luminance signal to provide gray controlled signals; and mixing said luminance crispened signals, said horizontal compensated signals, said gray controlled signals and said luminance signals to provide said processed luminance signals.

33. The method for processing high frequency image signals as claimed in claim 31, wherein said processed chrominance signals generating step comprises:

amplifying and maintaining said chrominance signals at a constant gain level in dependence upon said demodulated chrominance signals to provide gain-controlled chrominance signals;

demodulating said gain-controlled chrominance signal in accordance with burst signals to provide said demodulated chrominance signals respectively representative of red-chrominance signals and blue-chrominance signals;

varying phases of said demodulated chrominance signals to determine correct coloring of said demodulated chrominance signals to provide first and second tint controlled signals;

reducing said transition time of the frequency components of said first and second tint controlled signals to provide first and second chrominance crispened signals; and multiplexing said first and second chrominance crispened signals to provide said processed chrominance signals.

* * * * *

UNITED STATES PATENT AND TRADEMARK OFFICE
CERTIFICATE OF CORRECTION

PATENT NO. : 5,335,069
DATED : August 2, 1994
INVENTOR(S) : Jung Hun Kim

It is certified that error appears in the above-indentified patent and that said Letters Patent is hereby corrected as shown below:

On the title page, item [75]:
Inventor: change "Jung H. Kim" to --Jung Hun Kim--;

On the title page, item [30]:
Foreign Application Priority Data

After "Korea . . . . .", change 91-1788" to --91-1918--:

| | | |
|---|---|---|
| Column 4 | Line 59, | after "706", delete comma " , " ; |
| Column 5 | Line 12, | preceding "differentiater", change "first" to --second--; |
| | Line 13, | preceding "-order", change "second" to --first--; |
| Column 6 | Line 41, | change "2H-b" to --2H-a--: |

UNITED STATES PATENT AND TRADEMARK OFFICE
CERTIFICATE OF CORRECTION

PATENT NO. : 5,335,069
DATED : August 2, 1994
INVENTOR(S) : Jung Hun Kim

It is certified that error appears in the above-indentified patent and that said Letters Patent is hereby corrected as shown below:

Column 11

Claim 6, Line 5, after "signal", insert --s--;

Column 13

Claim 13, Line 66, After "multiplexing", delete "either one of" and then insert --between--;

Column 15

Claim 19 Line 44, preceding "burst", insert --said--;

Claim 20 Line 54, after colon " : ", delete "p1";

Line 65, begin this line with an indent TAB;

UNITED STATES PATENT AND TRADEMARK OFFICE
CERTIFICATE OF CORRECTION

PATENT NO. : 5,335,069
DATED : August 2, 1994
INVENTOR(S) : Jung Hun Kim

It is certified that error appears in the above-indentified patent and that said Letters Patent is hereby corrected as shown below:

Column 15

Claim 20,    Line 66,    preceding "representative", insert --respectively--;

Column 16

Claim 21,    Line 45,    preceding "fourth", delete "p1";

Claim 22,    Line 62,    preceding "said", insert --wherein--;

Column 17

Claim 23,    Line 8,    preceding "reducing", insert an indent TAB:

Signed and Sealed this

Second Day of April, 1996

Attest:

BRUCE LEHMAN

*Attesting Officer*      *Commissioner of Patents and Trademarks*